(12) United States Patent
Gu et al.

(10) Patent No.: US 11,918,958 B2
(45) Date of Patent: Mar. 5, 2024

(54) FE-AL-BASED METAL POROUS MEMBRANE AND PREPARATION METHOD THEREOF

(71) Applicant: AT&M ENVIRONMENTAL ENGINEERING TECHNOLOGY CO., LTD., Beijing (CN)

(72) Inventors: Hu Gu, Beijing (CN); Junjun Yang, Beijing (CN); Fan Wang, Beijing (CN); Guanying Liu, Beijing (CN); Yu Zhang, Beijing (CN); Ying Dai, Beijing (CN); Xuan Yang, Beijing (CN); Kun Wang, Beijing (CN); Shiyu Lin, Beijing (CN)

(73) Assignee: AT&M ENVIRONMENTAL ENGINEERING TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/791,497

(22) PCT Filed: Jun. 4, 2020

(86) PCT No.: PCT/CN2020/094405
§ 371 (c)(1),
(2) Date: Jul. 7, 2022

(87) PCT Pub. No.: WO2021/189662
PCT Pub. Date: Sep. 30, 2021

(65) Prior Publication Data
US 2023/0032023 A1     Feb. 2, 2023

(30) Foreign Application Priority Data
Mar. 21, 2020   (CN) .......................... 202010204525.2

(51) Int. Cl.
*B01D 71/02*      (2006.01)
*B01D 39/20*      (2006.01)
(Continued)

(52) U.S. Cl.
CPC ..... *B01D 71/0223* (2022.08); *B01D 39/2034* (2013.01); *B01D 39/2044* (2013.01);
(Continued)

(58) Field of Classification Search
None
See application file for complete search history.

(56) References Cited

U.S. PATENT DOCUMENTS

| | | | |
|---|---|---|---|
| 6,436,163 B1 * | 8/2002 | Geibel | B22F 3/22 420/110 |
| 2005/0281699 A1 | 12/2005 | Kang et al. | |
| 2023/0074526 A1 * | 3/2023 | Gu | B01D 67/0046 |

FOREIGN PATENT DOCUMENTS

| CN | 101249389 A | 8/2008 |
|---|---|---|
| CN | 101439884 A | 5/2009 |

(Continued)

OTHER PUBLICATIONS

International Search Report of PCT/CN2020/094405.
Written Opinion of PCT/CN2020/094405.

*Primary Examiner* — Krishnan S Menon

(57) ABSTRACT

The present invention discloses a Fe—Al-based metal porous membrane and a preparation method thereof, which relate to the technical field of industrial gas-solid and liquid-solid separation and purification, and mainly address problems in the prior art, such as cracking-prone and peeling of a membrane layer of an existing Fe—Al-based metal porous membrane during its preparation and use. The preparation method of the present invention comprises the steps of: adding a Fe—Al-based metal powder and a metal fiber powder into an organic-additive-added water-based solvent, (Continued)

and mixing them into a slurry; casting the slurry, through a casting machine, to form a membrane green body on a metal substrate layer, and letting it dry; and placing the dried membrane green body in a sintering furnace, to remove organic substances and perform high-temperature sintering and predetermined-temperature reaction synthesis.

7 Claims, 3 Drawing Sheets

(51) Int. Cl.
  *B01D 67/00* (2006.01)
  *B01D 69/10* (2006.01)
(52) U.S. Cl.
  CPC .. *B01D 67/00411* (2022.08); *B01D 67/00412* (2022.08); *B01D 67/0046* (2013.01); *B01D 67/0069* (2013.01); *B01D 69/108* (2022.08); *B01D 2239/0654* (2013.01); *B01D 2323/081* (2022.08); *B01D 2323/12* (2013.01); *B01D 2323/20* (2013.01); *B01D 2323/2182* (2022.08); *B01D 2323/2185* (2022.08); *B01D 2325/22* (2013.01)

(56) References Cited

FOREIGN PATENT DOCUMENTS

| | | |
|---|---|---|
| CN | 101524609 A | 9/2009 |
| CN | 103386486 A | 11/2013 |
| CN | 103402601 A | 11/2013 |
| CN | 103695689 A | 4/2014 |
| CN | 105130481 A | 12/2015 |
| CN | 105854629 A | 8/2016 |
| CN | 105854633 A | 8/2016 |
| CN | 106000123 A | 10/2016 |
| CN | 106563630 A | 4/2017 |
| CN | 108079666 A | 5/2018 |
| CN | 110354694 A | 10/2019 |
| CN | 110868768 A | 3/2020 |
| JP | 6372319 A | 4/1988 |
| KR | 20040041814 A | 5/2004 |
| WO | 2008000049 A2 | 1/2008 |

* cited by examiner

FE-AL-BASED METAL POROUS MEMBRANE AND PREPARATION METHOD THEREOF

CROSS-REFERENCE TO RELATED APPLICATIONS

This Application is a national stage application of PCT/CN2020/094405. This application claims priorities from PCT Application No. PCT/CN2020/094405, filed Jun. 4, 2020, and from the Chinese patent application 202010204525.2 filed Mar. 21, 2020, the content of which are incorporated herein in the entirety by reference.

TECHNICAL FIELD

The present disclosure relates to the technical field of industrial gas-solid and liquid-solid separation and purification, and in particular to the technical field regarding a preparation method of a Fe—Al (Ferrous-Aluminum)-based metal porous membrane.

BACKGROUND

Fe—Al-based intermetallic compounds are widely used in industrial production and manufacturing industries, especially in two-phase separation and purification processes in coal and petrochemical industries, because of their heat, wear and corrosion resistance properties and the Kirkendall effect between metal elements at high temperatures, which can form pores in these materials. Traditional Fe—Al-based metal porous membrane can be used in high-temperature and high-corrosion filtration environments that porous membranes made of other materials cannot withstand, which greatly solves difficulties in separation and purification processes under harsh industrial conditions, however, development of such Fe—Al-based metal porous membranes are still restricted by inherent room-temperature brittleness of Fe—Al-based intermetallic compounds.

In order to better utilize the advantages of Fe—Al-based metal porous membranes, researchers have done a lot of research on how to overcome room-temperature brittleness of materials. Methods for toughening Fe—Al-based intermetallic compounds mainly include: a grain-refinement method, a (micro-)alloying method, and a composite toughening method. The grain-refinement method is generally realized by mechanical alloying. Give a same volume, refined grains can provide a boundary with a larger area, thus increasing probability of grain boundary glide, increasing deformation of a material, and thus improving strength and toughness of the material. However, the grain-refinement method does not work to its advantage in the field of metal porous membrane preparation, because grains should be sufficiently refined to effectively enhance toughness of a material, while overly refined grains will increase denseness of the material and cannot guarantee requirements on porosity and aeration of a filter medium. The (micro-)alloying method is to add element B into a Fe—Al-based intermetallic compound, to increase concentration near a grain boundary and reduce diffusion coefficient of H atoms along a grain boundary, so as to suppress brittleness in air and improve toughness of a material. Although the (micro-)alloying method can alleviate degree of control over strength- and speed-loading of a material due to the material's own brittleness, this method cannot fundamentally reform the material's brittle characteristics, moreover, the amount of element B needs to be strictly controlled, because neither a micro amount nor an excessive amount can achieve the effect of material toughening. Regarding preparation of a metal porous membrane, this method increases complexity of a preparation process, besides, there is no relevant study showing whether addition of element B will have an effect on properties of a metal porous membrane; therefore, this method is not applicable to production and manufacturing of metal porous membranes either. The composite toughening method is to add a reinforcing phase (such as particles, etc.) into a matrix of a Fe—Al-based intermetallic compound, enabling a boundary to transfer load through the reinforcing phase, adjusting stress distribution within the composite material and playing the effect of material toughening. Although particle reinforcing phase process is simple and easy, it is mostly used in preparation of a dense sintered body.

SUMMARY

So far, most methods for toughening a Fe—Al-based metal porous membrane are in process of research and experimentation. This disclosure, through research on materials' own properties and preparation process of a Fe—Al-based metal porous membrane, designs a high-strength and high-toughness Fe—Al-based metal porous membrane incorporating a metal fiber powder, which greatly brings into play the advantages of a Fe—Al-based intermetallic compound and makes it an excellent filtering medium in both filtration performance and strength performance. Because short fibers in a metal fiber powder, according to their own shapes measuring more in length than in diameter, can function to transfer, disperse and relieve stress among matrix particles, they can effectively improve fracture toughness of a composite material while keeping material strength almost unchanged. This method, when applied to manufacturing process of metal porous membranes, does not cause a problem of over-densification of matrix, which problem affects aeration of a filter medium, nor does it cause change in pore characteristics of a filter material due to addition of a reinforcing phase. Hence, by means of fiber reinforcement, the present disclosure enhances toughness of a Fe—Al-based porous membrane, suppresses defects of a Fe—Al-based intermetallic compound used as filtration medium, effectively brings into play the Fe—Al-based intermetallic compound's characteristics of high-temperature resistance and corrosion resistance, and solves problems of difficult separation and purification under severe working conditions and special conditions.

To this end, the present disclosure aims to:

1. change material composition of a traditional Fe—Al-based metal porous membrane by adding a metal fiber powder into raw materials for preparation of a porous membrane, so as to obtain a high-strength and high-toughness Fe—Al-based metal porous membrane, thus solving problems of cracking-prone and peeling of a membrane layer during preparation and use of a Fe—Al-based metal porous membrane.

2. adjust a raw material ratio of a Fe—Al-based metal powder and a metal fiber powder, so as to obtain a metal porous membrane product having an optimal matching of pore size and permeability.

3. adopt a casting method featuring simple equipment and continuous operation, and improve molding process of a metal porous membrane, so as to obtain a metal porous membrane medium with uniform pores and high porosity.

4. improve filtration performance and membrane strength of a Fe—Al-based metal porous membrane, extend service life of the metal porous membrane, so as to substitute stainless steel material, thus saving production costs and regeneration costs.

Accordingly, the present disclosure provides a method for preparing a Fe—Al-based metal porous membrane, the method comprising the steps of: adding a Fe—Al-based metal powder and a metal fiber powder into an organic-additive-added water-based solvent, and mixing them into a slurry; casting the slurry, through a casting machine, to form a membrane green body on a metal substrate layer, and letting it dry; and placing the dried membrane green body in a sintering furnace, to remove organic substances and perform high-temperature sintering and predetermined-temperature reaction synthesis, thus generating a Fe—Al-based metal porous membrane removed off the organic additive and having a uniform pore structure.

The present disclosure also provides a Fe—Al-based metal porous membrane, characterized in that, the Fe—Al-based metal porous membrane comprises a sintered metal substrate layer, and a sintered hybrid membrane layer composed of a Fe—Al-based metal powder and a metal fiber powder, wherein, the sintered hybrid membrane layer composed of a Fe—Al-based metal powder and a metal fiber powder is disposed above the sintered metal substrate layer; and wherein, the sintered metal substrate layer and the sintered hybrid membrane layer composed of a Fe—Al-based metal powder and a metal fiber powder are obtained, by casting a water-based solution containing an organic additive, the Fe—Al-based metal powder and the metal fiber powder, through a casting machine, to form a membrane green body on a metal substrate layer, and drying, and thereafter removing organic substances and performing high-temperature sintering and predetermined-temperature reaction synthesis.

With the above technical solutions, the present disclosure has the following advantages:

1. High Strength and Superior Toughness

The metal porous membrane designed by this disclosure has superior toughness, with its impact toughness being increased by more than two times as compared to an ordinary Fe—Al-based metal porous membrane without adding a metal fiber powder.

2. High-Temperature and Corrosion Resistance Experiments were conducted to compare Fe—Al-based intermetallic compounds with other alloys, such as 310S, 316L, Monel400, etc., with respect to oxidation weight gain rate and corrosion weight gain rate, under the same high-temperature and high-corrosion conditions, and inventors found that, Fe—Al-based metallic materials have a much lower oxidation weight gain rate than other alloys, and also a corrosion weight gain rate maintained at a lower level and basically not changing with time, thus showing excellent resistance to high temperature and corrosion.

3. Uniform Pores and High Permeability Compared to a Fe—Al membrane without incorporating a metal fiber powder, a metal porous membrane designed by the present disclosure has favorable pore characteristics, and achieves substantially improved membrane permeability with no large change in pore size.

Therefore, a Fe—Al-based metal porous membrane designed by the present disclosure achieves effectively enhanced toughness of the Fe—Al-based metal porous membrane, and can be widely used in gas-solid and liquid-solid separation process in industrial production. As a traditional Fe—Al-based metal porous membrane has defects during its production and use due to room-temperature brittleness of the Fe—Al-based intermetallic compound itself, the present disclosure improves raw material composition of a metal porous membrane by adding a metal fiber powder into powder raw materials, thus improving toughness and strength of the porous membrane, and effectively enhancing performances of the Fe—Al metal porous membrane, making it possible to substitute stainless-steel porous membrane products and thus reduce economic costs.

DETAILED DESCRIPTION

Figure 1:
FIG. 1 is a cross-sectional structure of a Fe—Al-based metal porous membrane in accordance with the present disclosure.

Hereinafter, the present disclosure will be described in detail with reference to the accompanying drawings, in which same or similar reference numerals indicate same or similar components.

FIG. 1 is a cross-sectional structure of a Fe—Al-based metal porous membrane in accordance with the present disclosure. As shown in FIG. 1, the Fe—Al-based metal porous membrane of the present disclosure comprises a sintered metal substrate layer 1, and a sintered hybrid membrane layer 2 composed of a Fe—Al-based metal powder and a metal fiber powder, wherein, the sintered hybrid membrane layer 2 composed of a Fe—Al-based metal powder and a metal fiber powder is disposed above the sintered metal substrate layer 1.

In this embodiment, the metal substrate layer 1 may be in the form of a metal substrate membrane or a metal wire mesh; by casting a water-based solution containing an organic additive, a Fe—Al-based metal powder and a metal fiber powder, through a casting machine, to form a membrane green body on a metal substrate layer 1, and drying, and thereafter removing organic substances and performing high-temperature sintering and predetermined-temperature reaction synthesis on the dried membrane green body, thus generating a Fe—Al-based metal porous membrane removed off the organic additive and having a uniform pore structure, thereby the Fe—Al-based metal porous membrane of the present disclosure consisting of as-a-whole incorporated two layers, i.e. the sintered metal substrate layer 1 and the sintered hybrid membrane layer 2 composed of the Fe—Al-based metal powder and the metal fiber powder, is obtained.

In the present disclosure, the Fe—Al-based metal powder preferably is one or two selected from a $Fe_3Al$ powder and a FeAl powder, and more preferably is added with a Al powder; the metal fiber powder preferably is one or more selected from 304L, 316L and 310S stainless steel fiber powders; the metal substrate membrane or metal wire mesh preferably is made of one material selected from 310S, 304L and 316L; and, the organic additive is a binder, a plasticizer and a dispersant, and preferably includes one or more selected from polyvinyl alcohol, methyl cellulose, polyethylene glycol, propanetriol, and dibutyl phthalate.

Figure 2:
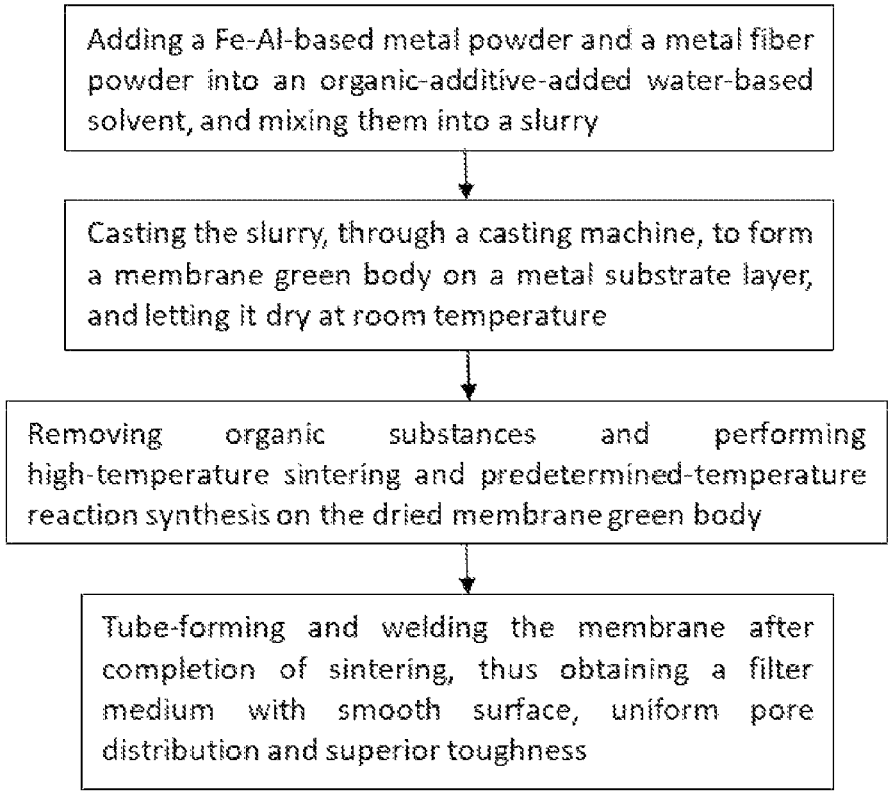
FIG. 2 is a flowchart of a method for preparing a Fe—Al-based metal porous membrane in accordance with the present disclosure.

FIG. 2 is a flowchart of a method for preparing a Fe—Al-based metal porous membrane in accordance with the present disclosure. As shown in FIG. 2, the preparation method of the present disclosure comprises the following steps:

1. adding a Fe—Al-based metal powder and a metal fiber powder into an organic-additive-added water-based solvent, stirring and mixing to prepare a uniform and stable slurry;
2. casting the slurry, through a casting machine, to form a membrane green body on a metal substrate layer such as a metal substrate membrane or a metal wire mesh, and drying it at room temperature;
3. placing the dried membrane green body in a sintering furnace, to remove organic substances and perform high-temperature sintering and predetermined-temperature reaction synthesis, thus generating a Fe—Al-based metal porous membrane removed off the organic additive and having a uniform pore structure.

In addition, in a case where the Fe—Al-based metal porous membrane needs to be made into a filter medium, the preparation method may further comprise the step of:

4. Tube-forming and welding the Fe—Al-based metal porous membrane after completion of sintering, thus obtaining a filter medium with smooth surface, uniform pore distribution and superior toughness.

In this embodiment, the Fe—Al-based metal porous membrane of the present disclosure is a composite of a metal substrate layer (which may be a metal substrate membrane or a metal wire mesh) and a hybrid membrane layer composed of a Fe—Al-based metal powder and a metal fiber powder; the Fe—Al-based metal powder preferably is one or two selected from a FeAl powder and a $Fe_3Al$ powder, and more preferably is added with a Al powder; the metal fiber powder preferably is one or more selected from 304L, 310S and 316L stainless steel fiber powders; the metal substrate membrane or metal wire mesh preferably is made of one material selected from 304L, 310S and 316L; and, the organic additive is a binder, a plasticizer and a dispersant, and preferably includes one or more selected from polyvinyl alcohol, methyl cellulose, polyethylene glycol, propanetriol, and dibutyl phthalate.

The Fe—Al-based metal powder and the metal fiber powder are mixed to obtain a slurry as a raw material for preparing a Fe—Al-based metal porous membrane, then the slurry is cast, by using a cast molding method, on a metal substrate layer to form a molded green body having uniform pores, homogeneous performance and consistent size, and thereafter, through a sintering process in a sintering furnace, the molded green body is removed off organic substances from its framework and strength of the metal porous membrane is reinforced, lastly, the metal porous is taken out of the sintering furnace, and then by means of tube-forming and welding, a high-strength and high-toughness metal porous membrane filter medium is obtained, and finally, connection of a whole filter element is accomplished by electric resistance welding.

Different from a traditional cast molding process, the present disclosure optimizes and improves cast technology by selecting a water-based solvent to substitute an organic solvent used in a traditional process. Generally speaking, organic solvents used in cast technology, such as toluene and xylene, etc., all have certain toxicity, which not only cause pollution to equipment and environment, but also make it difficult to completely remove off a high-content organic substance in a cast slurry, thus affecting performance of a resultant metal membrane and causing quality problems of deformation and cracking during fabrication processing of the metal membrane. Comparatively, the water-based solvent of the present disclosure is an aqueous solution added with a small amount of binder, plasticizer and dispersant, which can be mixed with a metal powder for uniformity in a designed ratio to obtain a stable slurry.

Figure 3:
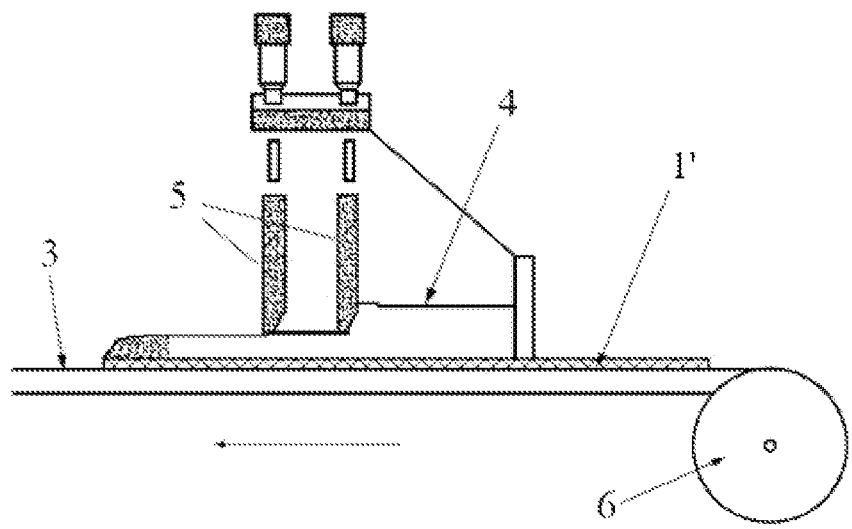
FIG. 3 is a schematic diagram of a casting process equipment used in a preparation method of the present disclosure.

FIG. 3 is a schematic diagram of a casting process equipment used in a preparation method of the present disclosure. As shown in FIG. 3, a metal substrate layer 1' (such as a metal substrate membrane or a metal wire mesh) in construction of a Fe—Al-based metal porous membrane of the present disclosure is placed on a base plate 3 of a lining belt of a casting machine; a prepared cast slurry is put into a slurry tank 4, and then through adjustment of a spacing between a doctor blade 5 and the lining belt as well as a moving speed of a belt pulley 6, a uniform slurry membrane also called a green body is cast onto the metal base substrate layer 1'; after the metal membrane green body is dried and peeled off from the base plate 3, it is transferred to a sintering process for degreasing and sinter-molding.

Figure 4:
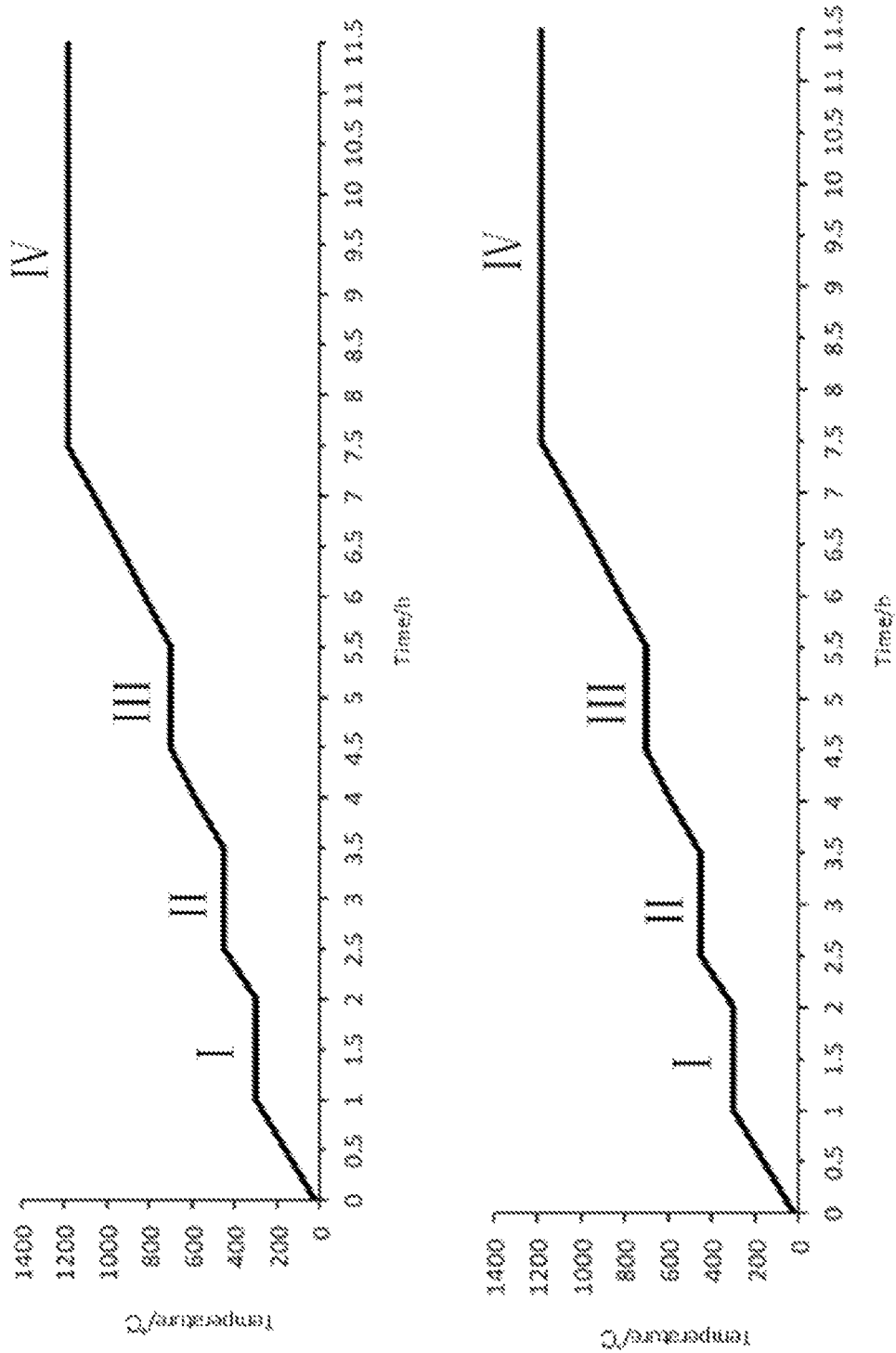
FIG. 4 is a diagram of a sintering and heating process in a preparation method of the present disclosure.

Now referring to a sintering and heating process diagram shown in FIG. 4, an organic substance removal and sintering process in the preparation method of the present disclosure will be described below. As seen from the sintering and heating process shown in FIG. 4, a heating procedure in this process is divided into four stages. A first stage (I) is heating up to 280-320° C., in order to remove the organic additive from the prepared slurry. A second stage (II) is heating up to below 450° C. (which is the melting-point temperature of Al element), in order to inhibit self-propagation and induce Kirkendall effect, so as to promote formation of a Fe—Al-based intermetallic porous material. A third stage (III) is slow heating up to 650-730° C., reaching a temperature above the melting point of Al element, in order to consume the Al element in the membrane green body and increase porosity. In this stage, reaction synthesis occurs, releasing a large amount of heat, making the membrane's (i.e., the membrane green body's) temperature rise rapidly; therefore, it is necessary to control a heating-up speed of this stage to reduce reaction intensity, so as to avoid over-intense reaction and uneven heating of the (membrane) green body resulting in cracking and overall deformation of the sintered green body. A fourth stage (IV) is continuing slow heating up, to form sintering necks between powder particles and powder fibers in the membrane, so as to obtain a uniform pore structure.

According to structural characteristics of the metal membrane, electric resistance welding is selected as a welding method for jointing the metal membrane. The sintered membrane is cut to a suitable size by a shearing machine, and then formed into a cylinder shape by a tube-forming process equipment, with a upper and a lower portions of the membrane being lapped at a joint. The lap-joint is pressed firmly between disc-shaped electrodes and electrically welded, thus a cylinder membrane is obtained.

To further describe the method for preparing a Fe—Al-based metal porous membrane in accordance with the present disclosure, specific examples of the Fe—Al-based metal powder in the forms of $Fe_3Al$/FeAl metal powders respectively are given below.

Example 1

1. Adding a 1000 g-500 mesh atomized $Fe_3Al$ powder, a 100 g-500 mesh Al powder, and a 100 g stainless steel fiber powder respectively into a water-based solvent (wherein, a ratio of the three powders is 10:1:1, and a specific range of the ratio may be finely adjusted accordingly), and mixing them with methyl cellulose, polyethylene glycol, etc., and stirring for uniformity, to form a stable slurry.

2. Laying a 60 mesh 316L stainless-steel metal substrate membrane on a base plate of a casting machine, and then casting the slurry on a surface of the metal substrate membrane, by using the casting machine, to form a cast green body with a uniform thickness, wherein, according to a desired thickness, a spacing of a doctor blade is controlled in a range between 0.4-0.6 mm, and a moving speed of a lining belt is controlled in a range of 0.5-0.7 mm/s.

3. Placing the base plate bearing the cast green body in a room-temperature environment, and drying it for 1-3 h.

4. Peeling the dried membrane from the base plate, and transferring it into a vacuum sintering furnace for degreasing and sintering, wherein, a first stage is heating up to 280-320° C. and retaining temperature for 2 h, a second stage is heating up to below 450° C. and retaining temperature for 2 h, a third stage is slow heating up to 650-730° C. and retaining temperature for 1 h, and a fourth stage is continuing slow heating up to about 1300° C. to form firm sintering necks between powder particles and powder fibers in the membrane; after natural cooling, a membrane having a uniform pore structure is obtained.

5. The resultant Fe—Al-based metal porous membrane has a smooth and flat surface, with a porosity of 40%-50%.

Example 2

1. Adding a 750 g-500 mesh atomized $Fe_3Al$ powder, a 25 g-500 mesh Al powder, and stainless steel fiber powder respectively into a water-based solvent (wherein, a ratio of the three powders is 30:1:1, and a specific range of the ratio may be finely adjusted accordingly), and mixing them with methyl cellulose, polyethylene glycol, etc., and stirring for uniformity, to form a stable slurry.

2. Laying a 60 mesh 316L stainless-steel wire mesh on a base plate of a casting machine, and then casting the slurry on a surface of the metal wire mesh, by using the casting machine, to form a cast green body with a uniform thickness, wherein, according to a desired thickness, a spacing of a doctor blade is controlled in a range between 0.4-0.6 mm, and a moving speed of a lining belt is controlled in a range of 0.5-0.7 mm/s.

3. Placing the base plate bearing the cast green body in a room-temperature environment, and drying it for 1-3 h.

4. Peeling the dried membrane from the base plate, and transferring it into a vacuum sintering furnace for degreasing and sintering, wherein, a first stage is heating up to 280-320° C. and retaining temperature for 2 h, a second stage is heating up to below 450° C. and retaining temperature for 2 h, a third stage is slow heating up to 650-730° C. and retaining temperature for 1 h, and a fourth stage is continuing slow heating up to about 1300° C. to form firm sintering necks between powder particles and powder fibers in the membrane; after natural cooling, a membrane having a uniform pore structure is obtained.

5. The resultant Fe—Al-based metal porous membrane has a smooth and flat surface, with a porosity exceeding 60%.

Example 3

1. Adding a 750 g-500 mesh atomized FeAl powder, a 25 g-500 mesh Al powder, and a 25 g stainless steel fiber powder respectively into a water-based solvent (wherein, a ratio of the three powders is 30:1:1, and a specific range of the ratio may be finely adjusted accordingly), and mixing them with methyl cellulose, polyethylene glycol, etc., and stirring for uniformity, to form a stable slurry.

2. Laying a 60 mesh 316L stainless-steel wire mesh on a base plate of a casting machine, and then casting the slurry on a surface of the metal wire mesh, by using the casting machine, to form a cast green body with a uniform thickness, wherein, according to a desired thickness, a spacing of a doctor blade is controlled in a range between 0.4-0.6 mm, and a moving speed of a lining belt is controlled in a range of 0.5-0.7 mm/s.

3. Placing the base plate bearing the cast green body in a room-temperature environment, and drying it for 1-3 h.

4. Peeling the dried membrane from the base plate, and transferring it into a vacuum sintering furnace for degreasing and sintering, wherein, a first stage is heating up to 280-320° C. and retaining temperature for 2 h, a second stage is heating up to below 450° C. and retaining temperature for 2 h, a third stage is slow heating up to 650-730° C. and retaining temperature for 1 h, and a fourth stage is continuing slow heating up to about 1300° C. to form firm sintering necks between powder particles and powder fibers in the membrane; after natural cooling, a membrane having a uniform pore structure is obtained.

5. The resultant Fe—Al-based metal porous membrane has a smooth and flat surface, with a porosity exceeding 60%.

It should be noted that, based on the above detailed description of the present disclosure, a person of ordinary skill in the art can fully and clearly envisage similar embodiments for Fe—Al-based metal powders other than $Fe_3Al$ and FeAl metal powders, therefore, description of them is omitted here.

Apparently, the aforementioned embodiments are merely examples illustrated for clearly describing the present disclosure, rather than limiting the implementation ways thereof. For those skilled in the art, various changes and modifications in other different forms can be made on the basis of the aforementioned description. It is unnecessary and impossible to exhaustively list all the implementation ways herein. However, any obvious changes or modifications derived from the aforementioned description are intended to be embraced within the protection scope of the present disclosure.

The invention claimed is:

1. A method for preparing a Fe—Al-based metal porous membrane, wherein the method comprises the steps of:
adding a Fe—Al-based metal powder and a metal fiber powder into an organic-additive-added water-based solvent, and mixing them into a slurry;
casting the slurry, through a casting machine, to form a membrane green body on a metal substrate layer, and letting it dry; and
placing the dried membrane green body in a sintering furnace, to remove organic substances and perform high-temperature sintering and predetermined-temperature reaction synthesis, thus generating a Fe—Al-based metal porous membrane removed off the organic additive and having a uniform pore structure, and forming firm sintering necks between powder particles and powder fibers in the membrane;
the Fe—Al-based metal powder is one or two selected from a $Fe_3Al$ powder and a FeAl powder, and the metal fiber powder is one or more selected from 304L, 316L and 310S stainless steel fiber powders; the metal substrate layer is made of one material selected from 310S, 304L and 316L; and, the organic additive include one or more selected from polyvinyl alcohol, methyl cellulose, polyethylene glycol, propanetriol, and dibutyl phthalate;
a Al powder is further added into the Fe—Al-based metal powder.

2. The preparation method according to claim 1, wherein a metal wire mesh is used as the metal substrate layer.

3. The preparation method according to claim 1, wherein the Fe—Al-based metal powder is a $Fe_3Al$ powder, and a raw material ratio of the Fe—Al-based metal powder, the Al powder and the metal fiber powder is adjusted to 10:1:1; and
during treatments in the sintering furnace, a first stage is heating up to 280-320° C. and then retaining temperature for 2 h, a second stage is heating up to below 450° C. and then retaining temperature for 2 h, a third stage is slow heating up to 650-730° C. and then retaining temperature for 1 h, and a fourth stage is continuing slow heating up to 1300° C.

4. The preparation method according to claim 1, wherein the Fe—Al-based metal powder is a $Fe_3Al$ powder, and a raw material ratio of the Fe—Al-based metal powder, the Al powder and the metal fiber powder is adjusted to 30:1:1; and
during treatments in the sintering furnace, a first stage is heating up to 280-320° C. and then retaining temperature for 2 h, a second stage is heating up to below 450° C. and then retaining temperature for 2 h, a third stage is slow heating up to 650-730° C. and then retaining temperature for 1 h, and a fourth stage is continuing slow heating up to 1300° C.

5. The preparation method according to claim 1, wherein the Fe—Al-based metal powder is a FeAl powder, and a raw material ratio of the Fe—Al-based metal powder, the Al powder and the metal fiber powder is adjusted to 30:1:1; and
during treatments in the sintering furnace, a first stage is heating up to 280-320° C. and then retaining temperature for 2 h, a second stage is heating up to below 450° C. and then retaining temperature for 2 h, a third stage is slow heating up to 650-730° C. and then retaining temperature for 1 h, and a fourth stage is continuing slow heating up to 1300° C.

6. A Fe—Al-based metal porous membrane, wherein the Fe—Al-based metal porous membrane comprises a sintered metal substrate layer (1), and a sintered hybrid membrane layer (2) composed of a Fe—Al-based metal powder and a metal fiber powder, wherein, the sintered hybrid membrane layer (2) composed of a Fe—Al-based metal powder and a metal fiber powder is disposed above the sintered metal substrate layer (1); and
wherein, the sintered metal substrate layer (1) and the sintered hybrid membrane layer (2) composed of a Fe—Al-based metal powder and a metal fiber powder are obtained, by casting a water-based solution containing an organic additive, the Fe—Al-based metal powder and the metal fiber powder, through a casting machine, to form a membrane green body on a metal substrate layer (1), and drying, and thereafter removing organic substances and performing high-temperature sintering and predetermined-temperature reaction synthesis;
a Al powder is further added into the Fe—Al-based metal powder.

7. The Fe—Al-based metal porous membrane according to claim 6, wherein the Fe—Al-based metal powder is one or two selected from a $Fe_3Al$ powder and a FeAl powder, and the metal fiber powder is one or more selected from 304L, 316L and 310S stainless steel fiber powders;
the metal substrate layer is a metal wire mesh, and made of one material selected from 310S, 304L and 316L; and, the organic additive is a binder, a plasticizer and a dispersant, and includes one or more selected from polyvinyl alcohol, methyl cellulose, polyethylene glycol, propanetriol, and dibutyl phthalate.

* * * * *